United States Patent Office 3,555,098
Patented Jan. 12, 1971

3,555,098
HYDROFORMYLATION
Kenneth L. Olivier and Frank B. Booth, Placentia, and David E. Mears, Fullerton, Calif., assignors to Union Oil Company of California, Los Angeles, Calif., a corporation of California
No Drawing. Filed Dec. 13, 1967, Ser. No. 690,089
Int. Cl. C07c 45/12
U.S. Cl. 260—604                          9 Claims

ABSTRACT OF THE DISCLOSURE

Catalytic activity is maintained in a hydroformylation reaction by the treatment of all or a portion of the recycled reaction medium containing the catalyst with an aqueous solution, preferably with an alkaline aqueous solution. The treatment is effective at mild conditions and results in the extraction of the byproduct acid formed in the hydroformylation which unless removed deactivates the catalyst. The invention is applicable to the hydroformylation reactions performed in liquid phase using a complex of a biphyllic ligand and a Group VIII noble metal catalyst, preferably a rhodium complex with a triaryl phosphine.

DESCRIPTION OF THE INVENTION

The invention comprises a method for maintaining the activity of a catalyst in a hydroformylation process.

In the hydroformylation reaction a liquid phase reaction medium containing a soluble catalyst is contacted with an olefin, carbon monoxide and hydrogen to effect the addition of the carbon monoxide to the olefin and produce aldehydes and/or alcohols as the product. Recent improvements in the catalysts have developed the use of biphyllic ligand complexes with Group VIII noble metals. These complexes stabilize the catalyst and achieve a more efficient processing than achieved in the absence of the biphyllic ligands. The biphyllic ligands are compounds capable of forming a complex with a catalyst by coordinate covalent bonding and have one atom with an unshared pair of electrons for such bonding. These can be organic compounds of trivalent phosphorus, antimony, arsenic and bismuth. When used with the Group VIII noble metals, the biphyllic ligand is preferably a triaryl compound.

Processes to which the treatment of our invention can be directly applied are described in copendnig applications Ser. Nos. 518,562 and 642,191. The hydrocarbonylation process comprises the contacting of the olefin, carbon monoxide and hydrogen with a liquid reaction medium containing a homogeneous catalyst at temperatures from about 20° to about 300° C. and pressures from 1 to about 1000 atmospheres. In the first of the aforementioned applications the catalyst is described as a Group VIII noble metal halide complex with carbon monoxide and a biphyllic ligand. Also included in the reaction medium is a cocatalyst comprising a polycyclic, heterocyclic, saturated amine having at least one nitrogen in a bridgehead position. In the other application, the catalyst employed is a Group VIII noble metal hydride complex with carbon monoxide and a biphyllic ligand.

We have found that during the hydrocarbonylation aforementioned, there occurs a slight but continuous formation of carboxylic acids from the oxidation of the aldehyde or alcohol product of the carbonylation. The cause of the oxidation is not known with a certainty; it is believed, however, that oxygen contamination of the reactant gas streams such as oxygen contamination of the carbon monoxide or hydrogen reactant is the source of the oxygen for the oxidation of the aldehyde or alcohol. Although this oxidation occurs to only a slight extent, the oxidation is continuous and the carboxylic acid will accumulate in the reaction medium since it is sufficiently high boiling that it is not removed during the product distillation. Accordingly, the carboxylic acid accumulates and is recycled to the reaction zone.

After the carbonylation has been performed over a prolonged period of time, e.g., greater than about 50 hours and generally greater than about 250 hours, a sufficient quantity of carboxylic acid accumulates in the reaction medium to effect a detectable decrease in conversion rate. The cause for this observed decrease in reactivity is not obvious from the processing. In a related process using a non-noble metal complex with a biphyllic ligand, typically a cobalt complex with tri-n-butyl phosphine, carboxylic acids are deliberately added to stabilize the catalyst. It was therefore surprising to find that carboxylic acids deactivated the noble metal catalyst.

It was also not believed that oxidation to carboxylic acids would occur in the highly reducing environment present in the hydrocarbonylation zone. Contrary to these expectations, it was discovered that a sufficient quantity of oxygen was present in the reactant streams to effect conversion of a portion of the product to carboxylic acid which was sufficiently high boiling to thus accumulate in the reaction zone and deactivate the catalyst.

It was found that the deactivation of the reaction medium for the hydrocarbonylation could be avoided by treatment of all or a portion of the reaction medium separated by the distillation step with an aqueous solution. With the low boiling products, simple water washing of a portion of the reaction medium can be used to maintain the catalyst activity. With the higher boiling aldehyde or alcohol products, washing with an aqueous solution of an alkaline material, e.g., alkali metal, ammonium or alkaline earth metal hydroxide is satisfactory. It was found that this treatment, preferably performed at ambient conditions, removed the carboxylic acid byproduct and prevented the deactivation of the reaction medium.

The catalyst for the hydrocarbonylation comprises a Group VIII noble metal hydride or salt, typically a halide, in complex association with carbon monoxide and/or a biphyllic ligand. There can also be incorporated in the catalyst a polycyclic, heterocyclic amine having a hydrogen atom in at least one bridgehead position. Examples of suitable Group VIII noble metal hydrides, carbonyls or salts useful in forming the catalyst are those which are commercially available and can be purchased and used directly. Examples of suitable sources of noble metal catalysts are as follows: bis(triphenylphosphine)iridium carbonyl chloride; tris(triphenylphosphine)iridium carbonyl hydride; iridium carbonyl; iridium tetrabromide; iridium tribromide; iridium trifluoride; iridium trichloride; osmium trichloride; chloroosmic acid; palladium hydride; palladous chloride; palladous cyanide; palladous iodide; palladous nitrate; platinic acid; platinous iodide; palladium cyanide; sodium hexachloroplatinate; potassium trichloro (ethylene)platinate (II); chloropentaaminorhodium (III) chloride; rhodium dicarbonyl chloride dimer; rhodium nitrate; rhodium trichloride; tris(triphenylphosphine)rhodium carbonyl hydride; tris(triphenylphosphine))rhodium (I) chloride; ruthenium trichloride; tetraaminorutheniumhydroxychloro chloride, etc. Suitable salts of Group VIII noble metals include the carboxylates of the alkanoic acids having up to about 6 carbons, nitrates, sulfates, halides, etc.

The catalyst also comprises a biphyllic ligand. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following formula:

E(R)₃ or the following formula:

(R)₂ER'E(R)₂ wherein:

E is a trivalent atom selected from the class consisting of phosphorus, arsenic, antimony and bismuth;
R is a member of the class consisting of hydrogen, alkyl from 1 to 8 carbon atoms, aryl from 6 to 8 carbons and amino, halo and alkoxy substitution products thereof; and
R' is alkylene having from 1 to about 8 carbons.

Examples of suitable biphyllic ligands useful in our invention to stabilize the catalyst composition are the following: trimethylphosphine, triethylarsine, triethylbismuthine, triisopropylstibine, chlorodiethylphosphine, triaminobutylarsine, ethyldiisopropylstibine, tricyclohexylphospine, triphenylphosphine, triphenylbismuthine, tri(o-tolyl)phosphine, tris(2-ethylhexyl)arsine, phenyldiisopropylphosphine, phenyldiamylphosphine, ethyldiphenylphosphine, chlorodixylylphosphine, chlorodiphenylphosphine, tris(diethylaminomethyl)phosphine, ethylene bis(diphenylphosphine), tritolylphosphine, tritolylstibine, hexamethylene bis(diisopropylarsine), pentamethylene bis(diethylstibine), diphenyl(N,N-dimethylanilinyl)phosphine, trianilinylphosphine, tri(3,5-diaminophenyl)phosphine, trianilinylarsine, anilinyldiphenylbismuthine, etc. Of the aforementioned, the arylphosphines are preferred because of the demonstrated non-equivalent greater activity of catalysts comprising the arylphosphines.

The cocatalyst employed with the Group VIII noble metal halide catalyst is a poly(heterocyclic)amine having at least one nitrogen in a bridgehead position. The term "bridgehead position" is well established in chemical nomenclature to identify the position of an atom which is common to at least two of the rings of the polycyclic compound. Preferably the amine is an atom-bridged system, i.e., atoms generally methylene carbons, form the bridge or link in the molecule rather than a simple valence bonding. The amine is also used in catalytic amounts, e.g., from about 0.001 to about 10 weight percent; preferably from about 0.05 to 5 weight percent of the liquid reaction medium. In general, amines having from 1 to about 4 nitrogen atoms and from 1 to about 25 carbons; preferably from 2 to about 10 carbons; can be employed for this purpose and the following is a listing of representative amines useful in our invention:

1,2,4-triazabicyclo(1.1.1)pentane;
1,5,6-triazabicyclo(2.1.1)hexane;
5-oxa-1,6-diazabicyclo(2.1.1)hexane;
5-thia-1,6-diazabicyclo(2.1.1)hexane;
2-oxa-1,5,6-triazabicyclo(2.1.1)hexane;
1,2,5,6-tetrazabicyclo(2.1.1)hexane;
5-oxa-1,2,3,6-tetrazabicyclo(2.1.1)hexane;
1-azabicyclo(3.3.1)heptane;
1-azabicyclo(2.2.1)heptane;
1,4-methano-1,1-pyrindine;
2-ox-1-azabicyclo(2.2.1)heptane;
1,4-diazabicyclo(2.2.1)heptane;
7-oxa-1-azabicyclo(2.2.1)heptane;
7-thia-1-azabicyclo(2.2.1)heptane;
1,7-diazabicyclo(2.2.1)heptane;
1,3,5-triazabicyclo(2.2.1)heptane;
1-azabicyclo(3.2.1)octane;
1,5-diazatricyclo(4.2.1)decane;
1,7-diazatricyclo(3.3.1.2)undecane;
7-ox-1-azabicyclo(3.2.1)octane;
1,7-diazabicyclo(3.2.1)octane;
3-thia-1,7-diazabicyclo(3.2.1)octane;
1,3,6,8-tetrazatricyclo(6.2.1)dodecane;
2,8-diazatricyclo(7.3.1)tetradecane;
1-azabicyclo(3.3.1)nonene, also known as 1-isogranatinine and the oxo, hydroxy and lower alkyl derivatives thereof;
1-azabicyclo(2.2.2)octane also known as quinuclidine as well as the halo, oxo, hydroxy and lower alkyl derivatives thereof;
1-azatricyclo(3.3.1.1)decane;
1,3-diazabicyclo(2.2.2)octane;
1,3-diazabicyclo(3.3.1)nonene;
1,6-diazatricyclo(5.3.1)dodecane;
2-ox-1-aza-bicyclo(2.2.2)octane;
4,6,10-triox-1-azatricyclo(3.3.1.1)decane;
1,5-diazabicyclo(3.3.1)nonene;
1,2,5,8-tetrazatricyclo(5.3.1.1)dodecane;
1,4-diazabicyclo(2.2.2)octane also known as triethylene diamine and its oxo, hydroxy, halo and lower alkyl derivatives thereof;
1,3-diazatricyclo(3.3.1.1)decane also known as 1,3-diazaadamantane;
1,3,5-triazatricyclo(3.3.1)decane;
1,3,5,7-tetrazabicyclo(3.3.1)nonene also known as pentamethylene tetramine;
1,3,5,7-tetrazatricyclo(3.3.1.1)decane also known as hexamethylene tetramine;
2-oxa-1,3,4-triazabicyclo(3.3.1)nonene;
1-azabicyclo(4.3.1)decane;
1-azabicyclo(3.2.2)nonene;
1,5-diazabicyclo(3.2.2)nonene;
1,3,5,7-tetrazabicyclo(3.3.2)decane;
1,5-diazabicyclo(3.3.3)undecane; etc.

Of the aforementioned poly(heterocyclic) amine having a nitrogen in a bridgehead position the most common and widely known compound is 1,4-diazabicyclo(2.2.2) octane (triethylene diamine) and this material as well as its oxo, hydroxy, halo and lower alkyl derivatives comprises the preferred cocatalyst for use in our process.

The ethylenically unsaturated compound carbonylated in accordance with our invention can comprise any olefin having from 2 to about 25 carbons; preferably from 2 to about 18 carbons. This olefin has the following structure:

R₂R₁C=CR₃R₄ wherein R₁, R₂, R₃ and R₄ are hydrogen, alkyl, cycloalkyl, aryl, alkaryl, aralkyl, hydroxyalkyl, hydroxyaryl, aminoalkyl or aminoaryl or wherein one of said R₁ and R₂ and one of said R₃ and R₄ together form a single alkylene group having from 2 to about 8 carbons.

Examples of useful olefins are the hydrocarbon olefins such as ethylene, propylene, butene-1, butene-2, 2-methylbutene-1, cyclobutene, hexene-1, hexene-2, cyclohexene, 3-ethylhexene-1, isobutylene, octene-1, 2-propylhexene-1, ethylcyclohexene, decene-1, cycloheptene, cyclooctene, cyclononene, 4,4' - dimethylnonene - 1, dodecene - 1, undecene-3, 6 - propyldecene - 1, tetradecene - 2, 7-amyldecene - 1, oligomers of olefins such as propylene tetramer, ethylene trimer, etc., hexadecene-1, 4-ethyltridecene-1, octadecene-1, 5,5-dipropyldodecene-1, vinylcyclohexene, allylcyclohexane, styrene, p-methylstyrene, alpha-methylstyrene, p-vinylcumene, beta-vinylnaphthalene, 1,1-diphenylethylene, allylbenzene, 6-phenylhexene-1, 1,3-diphenylbutene-1, 3-benzylheptene-1, o-vinyl-p-xylene, divinylbenbene and 1-allyl-4-vinylbenzene. Of the preceding the alpha olefins and olefins having 2 to about 8 carbons are preferred classes.

The reaction is performed under liquid phase conditions and, when the olefin comprises a liquid at the reaction conditions, the olefin can be use in excess to provide the liquid reaction medium. If desired, however, any suitable organic liquid can be employed as a reaction solvent; preferably, organic solvents which are inert to the reaction conditions, the reactants, the catalyst and the products are employed. Examples of suitable solvents which can be used in accordance with our invention include hydrocarbons such as the aromatic aliphatic or alicyclic hydrocarbons, ethers, esters, ketones, etc.

Examples of suitable hydrocarbons that can be employed in the solvents include aromatic hydrocarbons such as benzene, toluene, xylene, ethylbenzene, Tetralin, etc.; aliphatic hydrocarbons such as butane, pentane, isopentane, hexane, isohexane, heptane, octane, isooctane, naphtha, gasoline, kerosene, mineral oil, etc., alicyclic hydrocarbons, e.g., cyclopentane, cyclohexane, methylcyclopentane, Decalin, indene, etc.

Various alkyl and aryl ketones can also be employed as the reaction solvent, e.g., acetone, methylethyl ketone, diethyl ketone, diisopropyl ketone, ethyl-n-butyl ketone, methyl-n-amyl ketone, cyclohexanone, diisobutyl ketone, etc.

Ethers can also be employed as the reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as the solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl maleate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzooate, n-dibutyl phthalate, etc. A preferred class of ester solvents includes the lactones, e.g., butyrolactone, valerolactone and their derivatives having lower ($C_1$–$C_5$) alkyl substituents.

Alcohols can also be employed as a reaction solvent. Preferably tertiary alcohols are employed since these materials are substantially non-reactive under the reaction conditions. Primary and secondary alcohols can be employed but are less preferred since these materials can react with aldehyde compounds under the reaction conditions to produce acetals. While in some instances these may be desired products, it is generally desirable to produce the carbonyl compound or alcohol directly without the formation of the acetal. It is of course apparent that, if desired, the acetal can be hydrolyzed to obtain the aldehyde. Examples of alcohols that can be employed as solvents include the aliphatic and alicyclic alcohols such as methanol, ethanol, isopropanol, butanol, t-butanol, t-amyl alcohol, hexanol, cyclohexanol, etc.

Also useful as solvents for the reaction are the aldehyde products of the carbonylation. These products are surprisingly inert and resist aldol condensation and hydrogenation under the hydroformylation conditions. Accordingly, aldehydes such as propionaldehyde, butyraldehyde, valeric, hexanoic, heptenoic, caproic, decanoic aldehydes, etc., can be employed as the reaction medium.

The technique of our invention comprises the treatment of all or a portion of the reaction medium with an aqueous washing solution. In batch or discontinuous processing, the reaction can be performed for a sufficient period of time that deactivation is imminent and at such time all or portion of the reaction medium is washed with the aqueous solution. The rate of acid accumulation in the reaction medium depends on the severity of the processing conditions and the amount of oxygen contamination in the reactant gases. Generally, the reaction medium can be subjected to about 50 hours at gas rates of about 1000 volumes per liquid volume per hour. In the preferred continuous processing, the treatment is continuously applied to a minor portion of the recycle reaction medium that is separated in the product distillation tower. The amount of reaction medium which can be treated in the periodic or continuous treatment can be from about 5 to about 95 percent of the reaction medium; generally from about 10 to about 25 percent of the reaction medium.

The washing can be a simple water washing when the lower molecular weight olefins having up to about 4 carbons are hydrocarbonylated. When higher molecular weight olefins are reacted, the carboxylic acid byproducts have more limited solubility in water and accordingly it is desired to treat all or a portion of the reaction medium with an aqueous alkaline solution to saponify the carboxylic acid and thereby extract it into the aqueous phase.

In continuous processing, a portion of the hydrocarbonylation reaction medium is continuously withdrawn from the hydrocarbonylation reactor and the withdrawn portion is depressured to remove the soluble unreacted gases such as carbon monoxide and the excess olefin when low boiling hydrocarbon olefins such as ethylene, propylene or butene are reacted. The removed gases are repressured and recycled to the reaction zone. The depressured effluent is the distilled in a product fractionator to separate the low boiling products such as aldehydes or alcohols from the higher boiling reaction medium which contains the catalyst. The high boiling fraction is then returned directly to the reaction zone. The invention can be applied to this process by treatment of the aforementioned proportions of the recycle reaction medium in a continuous or intermittent, discontinuous application.

In other processing, the hydrocarbonylation reactor is maintained under a product stripping condition, i.e., the low boiling aldehyde or alcohol products are vaporized and removed as a vapor effluent from the reaction zone. In this technique the reaction medium remains within the reactor or within a closed loop between the reactor and an external cooler. In this processing, all or a portion of the reaction medium can be periodically or continuously treated with an aqueous wash according to our invention. This can be effected simply by withdrawing from 5 to 95 percent of the reaction medium and treating the withdrawn portion with the aqueous wash according to our invention.

The washing liquid can be water when the carboxylic acid by product is water soluble. This treatment will effect extraction of the $C_3$ to $C_5$ carboxylic acids into the aqueous phase without extraction of appreciable quantities of the hydrophobic catalyst. When acids having from about 6 to about 25 carbon atoms are formed as the byproduct of the oxidation, it is within the scope of our invention to employ an aqueous solution of an alkaline material to effect the extraction. Suitable alkaline materials include the alkali metal, alkaline earth metal and ammonium hydroxides such as sodium hydroxide, potassium hydroxide, lithium hydroxide, cesium hydroxide, barium hydroxide, calcium hydroxide, ammonium hydroxide, etc. The concentration of the alkaline material in the aqueous wash can be varied up to the limit of the solubility of the particular alkaline material employed. Preferably, however, to avoid extraction of the catalyst, the alkaline material is employed in concentrations from about 0.1 to about 10 weight percent and most preferably from about 0.5 to about 5 weight percent.

The washing is effected by simply mixing the aqueous medium with the reaction medium under treatment. This mixing can be accomplished using relative proportions of from about 0.01 to about 10 parts of the washing medium per part of the reaction medium. Preferably, the amount of washing medium is limited to avoid extraction of the catalyst to amounts from about 0.01 to about 0.5 part per part of reaction medium. The contacting is performed under conditions to insure adequate mixing, e.g., in batch processing by mixing the liquids in a vat with a propeller mixer, or in continuous processing by introduction of the washed liquid into the suction line of a centrifugal pump, or by introduction of the wash liquid upstream of one or more orifice plates in the line through which the reaction medium is circulated.

The resulting admixture of reaction medium and wash liquid can then be passed to a suitable separation step. Typically, the separation will be decantation of the liquids that can be accomplished by discharging the admixture into a settling tank which has a sufficient volume to permit the aqueous and/or organic phases to separate and which permits the withdrawal of the upper, organic phase from the aqueous phase. Other techniques that can be employed include other conventional liquid-liquid phase separation techniques such as centrifugal separation.

The treatment can be effected at any temperature from about 10° to about 125° C. To avoid dissolution of the catalyst the temperature of the treatment is preferably from about 10° to 75° C. The treatment can be effected at atmospheric or elevated pressures and preferably is performed at atmospheric pressure.

The invention will now be illustrated by the following examples:

EXAMPLE 1

A hydroformylation was performed over an extended reaction period by charging to a 600 milliliter, stirred reactor a catalyst solution comprising 1.6 grams of rhodium chlorocarbonyl bis-triphenyl phosphine, 4 grams of 1,4-diazabicyclo(2.2.2)octane (triethylenediamine) and 10 grams of triphenylphosphine per liter of toluene. The reactor contents were heated to 200° F. and maintained at a pressure of 500 p.s.i.g. while hydrogen, carbon monoxide and propylene were introduced into the reactor at rates of 150 liters per hour, 150 liters per hour, and 0.6 pound per hour, respectively. The initial rate of production of butyraldehyde was high, but declined about 32 percent over a period of 117 hours. The reaction was then discontinued, the reactor was cooled and depressured and the catalyst solution was removed. The product butyraldehyde was removed by distillation and the bottoms fraction was washed three times with 1 N sodium hydroxide solution. After each washing the mixture was permitted to separate into an aqueous and organic phase and the organic phase was removed and subjected to the successive washing. The catalyst after the third washing was recharged to the reaction zone and under the repeated conditions produced butyraldehyde at a rate slightly greater than the rate initially observed.

Substantially the same results are obtained when the reaction is applied to octene-1 and $C_{12}-C_{16}$ mixed olefins by the substitution of equal parts by weight of these olefins for the propylene of the preceding example.

EXAMPLE 2

A hydroformylation was performed by charging to a 600 milliliter, stirred reactor a reaction medium comprising 1.6 grams of rhodium hydrido carbonyl tris-triphenyl-phosphine and 10 grams of triphenylphosphine per liter of toluene. The reaction medium was heated to 225° F. and maintained at a pressure of 500 p.s.i.g. while hydrogen, carbon monoxide and propylene were introduced into the reactor at rates of 150 liters per hour, 150 liters per hour and 0.6 pound per hour, respectively. The initial rate of production of butyraldehyde was observed to be very high; however, this rate gradually decreased about 43 percent over a reaction period of about 117 hours. The reaction was discontinued, the reactor was cooled and depressured and the reaction medium was removed. The product butyraldehyde was recovered by distillation and the distillation residue was washed at room temperature three times with distilled water.

After the third washing, the separated organic phase was recharged to the reaction zone and, under repeated conditions, produced butyraldehyde at the reaction rate initially observed.

When other complexes of rhodium are substituted for the complex of the preceding example, substantially the same results are observed. To illustrate, when the catalyst is replaced with bis-tritolylphosphine rhodium hydrido carbonyl and the excess triphenylphosphine is replaced with 10 grams of tritolylphosphine, substantially the same results are observed.

The same reaction at a reduced rate of conversion is observed when the catalyst is replaced with the triphenylarsine or the triphenylbismuthine complex.

The substitution of other noble metals for the rhodium of the preceding example results in the same hydroformylation, although at a reduced rate. Thus, substitution of the bis-triphenylphosphine iridium chlorocarbonyl or bis-triphenylphosphine platinum chlorocarbonyl for the rhodium catalyst effects similar hydroformylation.

The invention is not intended to be unduly limited by the specific mode of practice illustrated. Instead, it is intended that the invention be defined by the steps and reagents and their obvious equivalents set forth in the following claims.

We claim:

1. In a hydrocarbonylation reaction wherein a hydrocarbon olefin having from about 2 to about 20 carbons is hydrocarbonylated to produce an aldehyde, alcohol, or mixtures thereof, having one more carbon atom per mol by contacting the hydrocarbon olefin, carbon monoxide and hydrogen with an organic reaction medium containing a soluble Group VIII noble metal catalyst in complex association with a biphyllic ligand and wherein said contacting is maintained for a sufficient period of time that a detectable decrease in reactivity of the reaction medium is observed, the improved method for preventing such decrease in reactivity and for maintaining the activity of the catalyst which comprises removing from 5 to 95 percent of the reaction medium from said reaction zone, admixing, at a temperature from 10° to about 125° C., said removed portion with an aqueous wash medium selected from the group consisting of water and an aqueous alkaline material selected from the group consisting of aqueous solutions of alkali metal hydroxides, alkaline earth metal hydroxides and ammonium hydroxide in an amount from about 0.01 to about 10 parts of said aqueous wash medium per part of said removed reaction medium and effective to extract a substantial amount of carboxylic acid by-products from said reaction medium, separating the resulting mixture into an aqueous and organic phase and returning said organic phase to said reaction zone.

2. The method of claim 1 wherein said aqueous washing medium comprises a solution containing from 0.5 to about 5 weight percent of an alkaline material selected from the class consisting of ammonia, alkali metal and alkaline earth metal hydroxides.

3. The method of claim 2 wherein said wash medium comprises a solution of sodium hydroxide.

4. The hydrocarbonylation of claim 1 wherein said hydrocarbon olefin is a hydrocarbon alpha olefin having from 2 to about 6 carbons.

5. The hydrocarbonylation of claim 1 wherein said catalyst comprises a Group VIII noble metal in complex association with a triaryl phosphine.

6. The hydrocarbonylation of claim 5 wherein said catalyst is a complex between a rhodium carbonyl hydride or halogen and triphenyl phosphine.

7. The method of claim 1 wherein the aqueous wash medium is water.

8. In a hydrocarbonylation reaction wherein a hydrocarbon olefin having from about 2 to about 20 carbons is hydrocarbonylated to produce an aldehyde, alcohol, or mixtures thereof, having one more carbon atom per mol by contacting of the hydrocarbon olefin, carbon monoxide and hydrogen with an organic reaction medium containing a soluble Group VIII noble metal catalyst in complex association with a biphyllic ligand and a saturated poly-(heterocyclic) amine cocatalyst having 1 to about 4 nitrogens and 1 to about 25 carbons and having at least one nitrogen in the bridgehead position and wherein said contacting is maintained for a sufficient period of time that a detectable decrease in reactivity of the reaction medium is observed, the improved method for preventing such decrease in reactivity and for maintaining the activity of the catalyst which comprises removing from 5 to 95 percent of the reaction medium from said reaction zone, admixing, at a temperature from 10° to about 125° C., said removed portion with an aqueous wash medium selected from the group consisting of water, an aqueous alkaline material selected from the group consisting of aqueous solutions of alkali metal hydroxides, alkaline earth metal hydroxides and ammonium hydroxide in an amount from about 0.01 to about 10 parts of said aqueous wash medium per part of said removed reaction medium and effective to extract a substantial amount of carboxylic acid by-products from said reaction medium, separating the resulting mixture into an aqueous and organic phase and returning said organic phase to said reaction zone.

9. The method of claim 8 wherein said amine is triethylenediamine.

References Cited
UNITED STATES PATENTS 2,810,680  10/1957  Buchner et al. _____ 260—604

LEON ZITVER, Primary Examiner

R. H. LILES, Assistant Examiner

U.S. Cl. X.R.

260—598, 599, 617, 618, 632